United States Patent
Keyes et al.

(10) Patent No.: US 9,892,461 B2
(45) Date of Patent: Feb. 13, 2018

(54) METHODS AND SYSTEMS FOR ASSESSING UNDERWRITING AND DISTRIBUTION RISKS ASSOCIATED WITH SUBORDINATE DEBT

(75) Inventors: Tim Kerry Keyes, West Redding, CT (US); Sean Coleman Keenan, Norwalk, CT (US); Charles Allred, Sandy Hook, CT (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 2159 days.

(21) Appl. No.: 12/135,884

(22) Filed: Jun. 9, 2008

(65) Prior Publication Data

US 2009/0307146 A1 Dec. 10, 2009

(51) Int. Cl.
G06Q 40/00 (2012.01)
G06Q 40/08 (2012.01)
G06Q 40/06 (2012.01)

(52) U.S. Cl.
CPC .............. *G06Q 40/08* (2013.01); *G06Q 40/06* (2013.01)

(58) Field of Classification Search
CPC ....... G06Q 40/00; G06Q 40/025; G06Q 40/06
USPC ...................................... 705/35–39
See application file for complete search history.

(56) References Cited

U.S. PATENT DOCUMENTS

| | | |
|---|---|---|
| 6,078,903 A | 6/2000 | Kealhofer |
| 6,085,175 A | 7/2000 | Gugel et al. |
| 6,456,983 B1 | 9/2002 | Keyes et al. |
| 6,985,881 B2 | 1/2006 | Johnson et al. |
| 7,003,484 B2 | 2/2006 | Keyes et al. |
| 7,003,490 B1 | 2/2006 | Keyes |
| 7,028,005 B2 | 4/2006 | Messmer et al. |
| 7,031,936 B2 | 4/2006 | Johnson et al. |
| 7,039,608 B2 | 5/2006 | Johnson et al. |
| 7,082,411 B2 | 7/2006 | Johnson et al. |
| 7,096,197 B2 | 8/2006 | Messmer et al. |
| 7,120,599 B2 | 10/2006 | Keyes |
| 7,162,445 B2 | 1/2007 | Johnson et al. |
| 7,165,043 B2 | 1/2007 | Keyes et al. |
| 7,409,357 B2 * | 8/2008 | Schaf et al. ................. 705/7.28 |
| 7,418,417 B2 * | 8/2008 | Chacko et al. ............. 705/36 R |
| 7,756,896 B1 * | 7/2010 | Feingold ...................... 707/791 |

(Continued)

OTHER PUBLICATIONS

Bank Loan Loss given Default; Moody's; Greg Gupton, 2000.*

(Continued)

*Primary Examiner* — Lalita M Hamilton
(74) *Attorney, Agent, or Firm* — Armstrong Teasdale LLP

(57) ABSTRACT

A method for assessing underwriting and distribution risks associated with a portfolio of subordinate debt is provided. The method is performed using a computer system coupled to a database. The method includes storing in the database historical bond issue data for a period of time preceding and proceeding at least one historical liquidity event and generating a plurality of simulated subordinate debt warehouses using the computer and the historical bond issue data stored in the database. The method also includes calculating a historical loss distribution based on the plurality of simulated subordinate debt warehouses generated. The method also includes determining a value at risk for a portfolio of subordinate debt resulting from a potential liquidity event by applying the historical loss distribution to the portfolio of subordinate debt.

31 Claims, 6 Drawing Sheets

(56) References Cited

U.S. PATENT DOCUMENTS

| | | |
|---|---|---|
| 7,761,373 B2 * | 7/2010 | Metz ............................... 705/38 |
| 2002/0120547 A1 * | 8/2002 | Zajac ............................... 705/37 |
| 2003/0033229 A1 | 2/2003 | Keyes et al. |
| 2003/0126071 A1 | 7/2003 | Keyes et al. |
| 2004/0034586 A1 | 2/2004 | Keyes et al. |
| 2004/0054563 A1 * | 3/2004 | Douglas ........................... 705/7 |
| 2005/0027645 A1 * | 2/2005 | Lui et al. ........................ 705/38 |
| 2005/0262013 A1 * | 11/2005 | Guthner et al. ................ 705/38 |
| 2007/0055595 A1 | 3/2007 | Keyes et al. |

OTHER PUBLICATIONS

Rating Policy Understanding Moody's Corporate Bond, Ratings and Rating Process; May 2002; Fons, Cantor, Mahoney.*
Linsmeier and Pearson; Value at Risk Jan. 1999.*

* cited by examiner

FIG. 6

| | | DEAL 1 | DEAL 2 | | DEAL 3 | | WAREHOUSE SUMMARY |
|---|---|---|---|---|---|---|---|
| 220 | ACTIVITY | | | | | | |
| | ACTIVITY TYPE | ADD | ADD | | ADD | | |
| 222 | DEAL SIZE ($MM) | 1,640.0 | | 1,120.0 | | 842.0 | |
| 226 | COMMITMENT ($MM) | 32.0 | 252.0 | | 623.0 | | 907.0 |
| 224 | DEMAND COUPON (bp) | 110.0 | 180.0 | | 200.0 | | |
| 228 | UNDERWRITING FEES (%) | 3.41% | 1.80% | | 2.93% | | |
| 230 | ISSUER RATING | B | BB- | | B+ | | |
| 232 | DEAL CLASS | HY | MEZZANINE | | HY | | |
| | DEAL PROBABILITY (%) | 100.0 | 100.0 | | 100.0 | | |
| 240 | EFFECTIVE DEAL SIZE ($MM) | 45.0 | 320.0 | | 623.0 | | |
| 246 | BASE VaR 85% ($MM) | (45)E% | (320)E% | | (623)E% | | |
| 248 | BASE VaR 99% ($MM) | (45)F% | (320)F% | | (623)F% | | |
| 254 | EXCESS FEES ($MM) | 0.4 | - | | | | 4.6 |
| 260 | FINAL VaR 85% ($MM) | (45)E%-0.4 | (320)E% | | (623)E%-4.2 | | |
| 262 | FINAL VaR 99% ($MM) | (45)F%-0.4 | (320)F% | | (623)F%-4.2 | | 4.2 |
| 270 | CUMULATIVE VaR 85% ($MM) | (45)E%-0.4 | ((45)E%-0.4)+(320)E% | | ((45)E%-0.4)+((320)E%)+((623)E%-4.2) | | |
| 272 | CUMULATIVE VaR 99% ($MM) | (45)F%-0.4 | ((45)F%-0.4)+(320)F% | | ((45)F%-0.4)+((320)F%)+((623)F%-4.2) | | |

METHODS AND SYSTEMS FOR ASSESSING UNDERWRITING AND DISTRIBUTION RISKS ASSOCIATED WITH SUBORDINATE DEBT

BACKGROUND OF THE INVENTION

This invention relates generally to assessing underwriting and distribution risks associated with subordinated debt, and more particularly, to network-based methods and systems for assessing a value at risk for a subordinated debt warehouse in the case of a liquidity event.

Commercial lenders generally engage in the business of lending money or capital to borrowers such as other business entities. Commercial lenders may lend such capital to a borrower by issuing a loan to the borrower which the borrower must pay back at a certain rate and over a certain period of time, or by purchasing a bond (or other debt instrument) from the borrower. A bond is a debt security, in which the authorized issuer (i.e., the borrower) owes the holders a debt and is obliged to repay the principal and interest (i.e., the coupon) at a later date, termed maturity. In other words, a bond is simply a loan, but in the form of a security. The issuer is equivalent to the borrower, the bond holder to the lender, and the coupon to the interest. Bonds enable the issuer to finance long-term investments with external funds.

Accordingly, business entities will oftentimes issue debt instruments such as bonds to borrow money for financing or expanding their business operations. These business entities are referred to as borrowers. The most common process of issuing bonds is through underwriting. In underwriting, one or more securities firms or banks, buy an entire issue of bonds from an issuer and re-sell them to investors. In other words, a borrower may use an underwriter, also known as a commercial lender, to issue bonds for raising money for the borrower. The bonds will be issued by the borrower to the underwriter. The underwriter purchases the bonds at a certain amount and provides certain underwriting services to the borrower. The fees associated with these underwriting services are in turn charged back to the borrower.

In most cases, shortly after purchasing the bonds from the borrower, the underwriter attempts to re-sell or distribute the bonds to investors. In the case of high yield bonds or mezzanine bonds, the bonds are not secured by collateral and are referred to as subordinated debt because such bonds are subordinate to other debt (i.e., in the case of a foreclosure, the primary or secured debt is paid first, and the subordinate or unsecured debt is paid last, if at all). In such a case, prior to distributing the bonds to investors, the underwriter is typically considered a holder of an unsecured or subordinated debt in the borrower. In other words, if a liquidity event occurs after the underwriter purchases the bonds and before the underwriter is able to re-sell the bonds to the investors, the underwriter may suffer a loss on the deal because there is no guarantee that the underwriter would be able to re-sell the bonds at an amount that will cover the purchase price of the bonds and because such bonds are not secured by collateral owned by the borrower. Accordingly, while the underwriter owns these high yield bonds (i.e., before the bonds are sold to investors), the underwriter is at risk for losses relating to the bonds.

In at least some known cases, underwriters will have a portfolio of underwritten deals and will also be evaluating other deals to underwrite. For example, an underwriter may have already underwritten bonds for Company AAA, Company BBB, and Company CCC, and may be considering underwriting bonds for Company DDD. Thus, before the underwriter is able to re-sell the bonds in its portfolio to investors, the underwriter may own bonds issued by Company AAA, Company BBB, and Company CCC, and may also be considering purchasing bonds from Company DDD. In such a case, the underwriter may have a significant amount of money at risk if a liquidity event were to take place before re-selling these bonds.

Accordingly, it would be helpful for an underwriter to be able to calculate with certainty a Value at Risk (VAR) for a portfolio of unsecured and/or subordinated bonds that the underwriter had underwritten but had not yet re-sold to investors. It would also be helpful for an underwriter to be able to determine how a bond issuance the underwriter is considering underwriting would affect the VAR for the underwriter's portfolio of unsecured and/or subordinated bonds.

BRIEF DESCRIPTION OF THE INVENTION

In one aspect, a method for assessing underwriting and distribution risks associated with a portfolio of subordinate debt is provided. The method is performed using a computer system coupled to a database. The method includes storing in the database historical bond issue data for a period of time preceding and proceeding at least one historical liquidity event and generating a plurality of simulated subordinate debt warehouses using the computer and the historical bond issue data stored in the database. The method also includes calculating a historical loss distribution based on the plurality of simulated subordinate debt warehouses generated. The historical loss distribution represents a reduction in value of the bonds stored in the database from the at least one historical liquidity event. The method also includes determining a value at risk for a portfolio of subordinate debt resulting from a potential liquidity event by applying the historical loss distribution to the portfolio of subordinate debt. The value at risk represents a value that based on the historical loss distribution, has a predetermined probability of eroding.

In another aspect, a system for assessing underwriting and distribution risks associated with a portfolio of subordinate debt is provided. The system includes a computer coupled to a database. The computer is configured to store in the database historical bond issue data for a period of time preceding and proceeding at least one historical liquidity event, generate a plurality of simulated subordinate debt warehouses using the historical bond issue data stored in the database, and calculate a historical loss distribution based on the plurality of simulated subordinate debt warehouses generated. The historical loss distribution represents a reduction in value of the bonds stored in the database from the at least one historical liquidity event. The computer is further configured to determine a value at risk for a portfolio of subordinate debt resulting from a potential liquidity event by applying the historical loss distribution to the portfolio of subordinate debt.

In another aspect, a server system for assessing underwriting and distribution risks associated with a portfolio of subordinate debt is provided. The system includes a client system comprising a browser, a centralized database for storing information, and a server system configured to be coupled to the client system and the database. The server is further configured to store in the database historical bond issue data for a period of time preceding and proceeding at least one historical liquidity event, generate a plurality of simulated subordinate debt warehouses using the historical bond issue data stored in the database, and calculate a historical loss distribution based on the plurality of simulated subordinate debt warehouses generated. The historical loss distribution represents a reduction in value of the bonds stored in the database from the at least one historical liquidity event. The server is further configured to determine a value at risk for a portfolio of subordinate debt resulting from a potential liquidity event by applying the historical loss distribution to the portfolio of subordinate debt.

In another aspect, a computer program embodied on a computer readable medium for assessing underwriting and distribution risks associated with a portfolio of subordinate debt is provided. The program includes at least one code segment that stores in a database historical bond issue data for a period of time preceding and proceeding at least one historical liquidity event. The program also includes at least one code segment that generates a plurality of simulated subordinate debt warehouses using the historical bond issue data stored in the database. The program also includes at least one code segment that calculates a historical loss distribution based on the plurality of simulated subordinate debt warehouses generated, the historical loss distribution representing reduction in value of the bonds stored in the database from the at least one historical liquidity event. The program also includes at least one code segment that determines a value at risk for a portfolio of subordinate debt resulting from a potential liquidity event by applying the historical loss distribution to the portfolio of subordinate debt.

BRIEF DESCRIPTION OF THE DRAWINGS

FIG. 6 is an exemplary chart showing a plurality of high yield bond deals included within a warehouse of an underwriter having values processed by the system shown in FIG. 1.

DETAILED DESCRIPTION OF THE INVENTION

Figure 1:
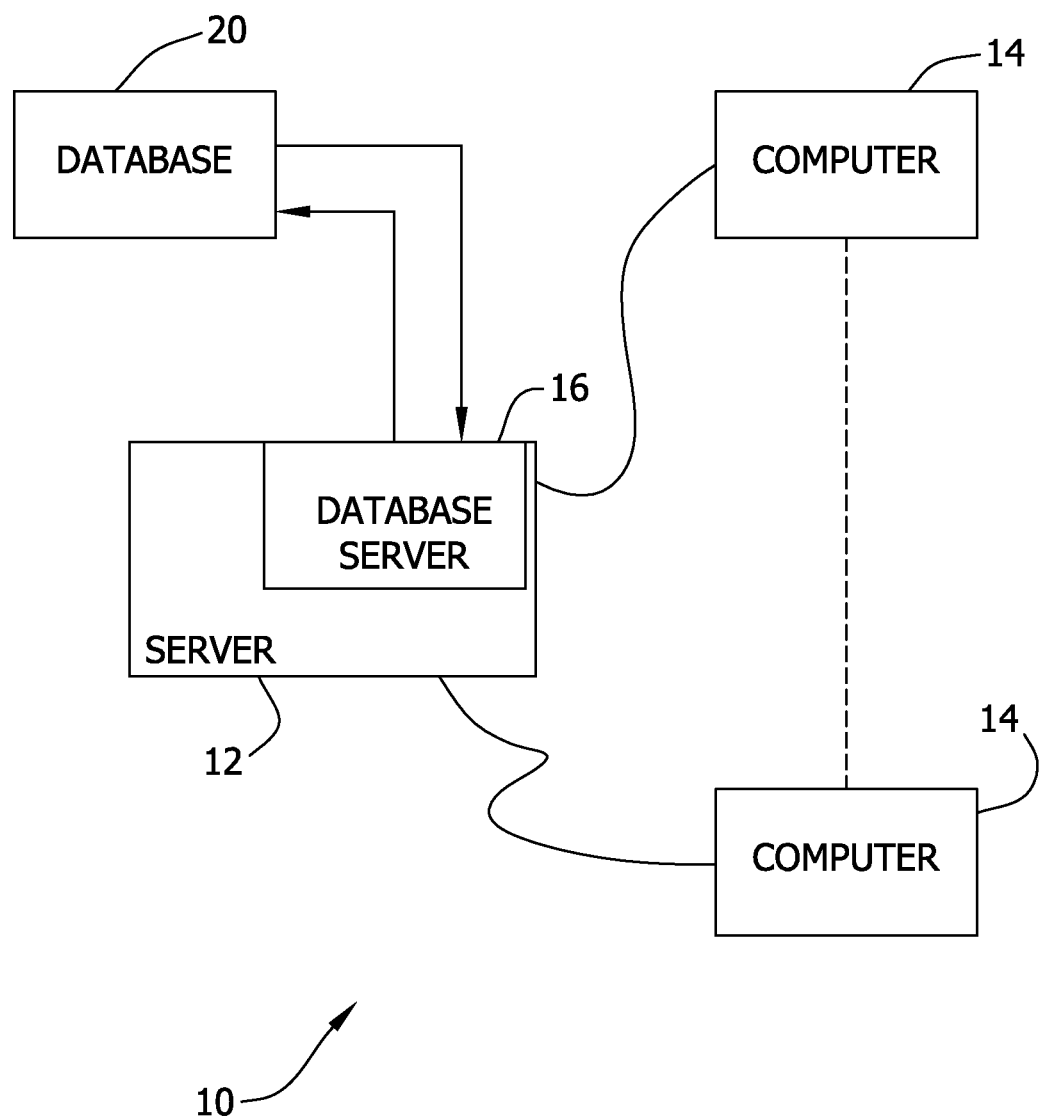
FIG. 1 is a simplified block diagram of an exemplary system in accordance with one embodiment of the present invention. The system is referred to as a Value at Risk (VAR) analysis system.

Described in detail below are exemplary embodiments of systems and processes that enable an underwriter of high yield bonds to assess underwriting and distribution risks associated with the high yield bonds. Although described as relating to high yield bonds, the systems and processes described herein may also be applied to any subordinated debt, for example, but not limited to, high yield bonds and mezzanine bonds. More specifically, described in detail below are exemplary embodiments of network-based systems and methods for assessing a Value at Risk (VAR) for a subordinated debt warehouse if a liquidity event were to occur.

As a matter of background, underwriting is a process in which a person or company ("underwriter") takes on the risk of distributing a security, for example, a bond issue. A deal size is defined as the total amount of subordinated debt issued by a borrower. An underwriter's commitment is the underwriter's share of the total amount of subordinated debt issued. The underwriter commits to purchasing and distributing the underwriter's commitment of the borrower's bond issue. The underwriter owns the bonds until the underwriter sells the bonds to other investors. If the underwriter is unable to sell all of the bonds, the underwriter remains the owner of the bonds and carries the risks associated with the bonds. Underwriting fees are awarded to the underwriter to offset underwriting costs and are typically referred to as a percentage of the amount the underwriter commits to purchase. A demand coupon is an agreed upon number of basis points representing a pricing flex that is exercisable by the underwriter when the underwriter is unable to sell the bonds at a reasonable price. The demand coupon is used as an offset to value erosion in a liquidity crisis. Typically, the demand coupon is not transferable between bond issues within a subordinated debt warehouse, as it is only exercisable upon the failure of a specific bond within the warehouse.

Underwriting fees and demand coupons may at least partially be based on issuer ratings. Issuer ratings are typically issued by credit rating agencies, such as, but not limited to, Standard & Poor's (S&P) and Moody's Corporation. These companies provide issuer ratings based on the credit-worthiness of the borrowers using a standardized ratings scale.

The systems and methods described herein are directed toward addressing the risk presented to an underwriter by a subordinated debt warehouse. The risk presented to an underwriter by a subordinated debt warehouse will vary, and can, to a point, be mitigated, by demand coupons and underwriting fees.

A subordinated debt warehouse is a collection of multiple "deals" entered into by an underwriter and is analogous to a portfolio of an investor, which is a collection of investments. Each deal is a business transaction. For example, a deal may include an underwriting agreement in which an underwriter agrees to purchase a certain percentage of a bond issue offered by a borrower, in exchange for underwriting fees and interest. In this example, the deal would remain in the debt warehouse until the underwriter re-sells the bonds to investors. At that point, the underwriter has divested itself of the risks involved in holding the bonds by recouping the money advanced to the borrower. However, it would be helpful for an underwriter to be able to calculate with certainty a VAR for a warehouse of unsecured and/or subordinated bonds that the underwriter had underwritten but had not yet re-sold to investors. This is especially important as the total value of underwritten bonds held in the debt warehouse increases.

The systems and processes described herein include selecting a pool of high yield bonds that were issued during a predetermined period of time, specifically, before and after a liquidity event. The systems and processes described herein include storing within a database historical bond data corresponding to the actual performance of the high yield bonds within the selected pool of high yield bonds. The systems and processes described herein also include comparing each bond's price at various times leading up to, during, and shortly after the liquidity event, and analyzing the historical bond data stored within the database. Analyzing the historical bond data includes performing a simulation analysis by randomly selecting bond issues from the pool of high yield bonds to form trial debt warehouses. The simulation analysis may include performing a Monte Carlo simulation analysis.

As described above, the historical bond data stored within the database includes bond performance data that corresponds to at least one specific time period in history wherein the high yield bond market experienced a liquidity event. In the example embodiment, a liquidity event may include a period of time wherein the decline in the bond market index was greater than any other time period being considered. One example of a specific liquidity event that produced bond performance data of interest is the 1998 Asian Debt Crisis. More specifically, data collected during the three months where the largest decline in the bond index occurred (August-October 1998), and the six months preceding this period of time may be included within the historical bond data stored within the database. Another example of a specific liquidity event that produced bond performance data of interest occurred during the time period of 2000-2001, which has been referred to as the 2000-2001 Recession. More specifically, data collected during the three months where the largest decline in the bond index occurred (September-November 2000), and the six months preceding, are of interest. The bond data collected includes issue characteristics and month-to-month pricing movement for bonds issued during these time periods of interest.

In the example embodiment, historical data corresponding to debt instrument performance during, and immediately prior to, a liquidity event is used to produce a distribution of outcomes, also referred to herein as a baseline warehouse loss distribution. The baseline loss distribution is a statistical distribution of the effect of the liquidity event on randomly-populated debt warehouses.

The baseline loss distribution is generated by analyzing the recorded historical data. In other words, historical data pertaining to actual deals that were entered into during, and immediately prior to, a liquidity event is collected, stored in a database, and used to produce the baseline warehouse loss distribution. The historical data may include, but is not limited to, issue characteristics and month-to-month pricing movement of the actual deals. The baseline warehouse loss distribution is determined by simulating the effects of the liquidity event on a plurality of randomly-populated trial warehouses. More specifically, a Monte Carlo simulation analysis is performed to create a plurality of randomly-populated trial warehouses for determining the baseline warehouse loss distribution. Actual deals that are stored in the database are randomly selected and assembled into trial warehouses having a predetermined maximum value. In an exemplary embodiment, the baseline warehouse loss distribution is determined for trial warehouses holding no more than a predetermined dollar value of deals, for example, five-hundred million dollars in deals.

In the example embodiment, over three-thousand trial warehouses are analyzed to determine the baseline warehouse loss distribution. As stated above, each trial warehouse includes a randomly-selected plurality of deals. From the analysis of the over three-thousand trial warehouses, the baseline loss distribution is generated. Certain assumptions and model structures may be considered prior to performing the process including, but not limited to, selecting only issues with available market pricing for the first and the last day of the liquidity event, including all industries and all bond ratings in the initial simulation, and setting a predetermined limit on the number of bonds in each of the trial warehouses and the value of the bonds in each of the trial warehouses. By using an iterative sampling technique, such as the Monte Carlo analysis, the performance of a plurality of randomly-populated warehouses is simulated to produce a distribution of outcomes.

As a matter of background, in depth analysis of the bond markets is important in the situations above due to the risk involved in investing in high yield and mezzanine bonds. Calculating a VAR to a predetermined level of confidence may be used to assemble debt warehouses, and within an institution to make decisions such as approval or non-approval to add a bond deal to a debt warehouse. The methods and systems described herein facilitate the use of historical data to predict to a predetermined level of certainty, a VAR for a proposed debt warehouse.

The systems and processes described herein enable a user, such an underwriter, to predict a VAR, to a predetermined level of confidence, for a potential debt warehouse based on modeling generated from an analysis of historical bond performance data corresponding to at least one past liquidity event. In other words, after an underwriter assembles a potential debt warehouse and enters the information into the system described herein, the underwriter is provided with a VAR of the potential debt warehouse, wherein the VAR is determined using historical data relating to a period of very poor performance of the bond market.

The systems and processes facilitate, for example, electronic submission of information using a client system, automated extraction of information, and web-based reporting for internal and external system users. A technical effect of the systems and processes described herein include at least one of (a) recording in a computer system historical bond performance data from at least one liquidity event, including comparing bond prices on the first and last days of the event, (b) simulating the effect of the liquidity event on trial warehouses that include randomly-selected bonds from the bonds whose historical bond performance data is stored to assess a cumulative potential loss exposure using predictive trials, (c) generating a baseline warehouse loss distribution from the cumulative potential loss exposure determined by the predictive trials, (d) generating an adjusted warehouse loss distribution by adjusting the baseline warehouse loss distribution to account for underwriting fees and demand coupons, and (e) applying the adjusted warehouse loss distribution to a plurality of deals that form a potential bond warehouse to calculate whether the plurality of deals may be included in the warehouse without exceeding a predetermined risk level.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of an exemplary system 10 in accordance with one embodiment of the present invention. System 10 includes a server system 12, and a plurality of client sub-systems, also referred to as client systems 14, connected to server system 12. Computerized modeling and grouping tools, as described below in more detail, are stored in server system 12 and can be accessed by a requester at any one of client systems 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail.

In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized. In an example embodiment, database 20 is configured to store data including, but not limited to, historical bond performance data from at least one liquidity event, simulated loss exposure data, baseline warehouse loss data and distributions, adjusted warehouse loss data and distributions, and calculated result values.

The embodiments illustrated and described herein as well as embodiments not specifically described herein but within the scope of aspects of the invention constitute exemplary means for assessing underwriting and distribution risks associated with subordinated debt, and more particularly, constitute exemplary means for assessing a value at risk for a subordinated debt warehouse in the case of a liquidity event. For example, the server system 12 or the client system 14, or any other similar computer device, programmed with computer-executable instructions illustrated in FIG. 3 constitutes exemplary means for assessing a value at risk for a subordinated debt warehouse in the case of a liquidity event.

Figure 2:
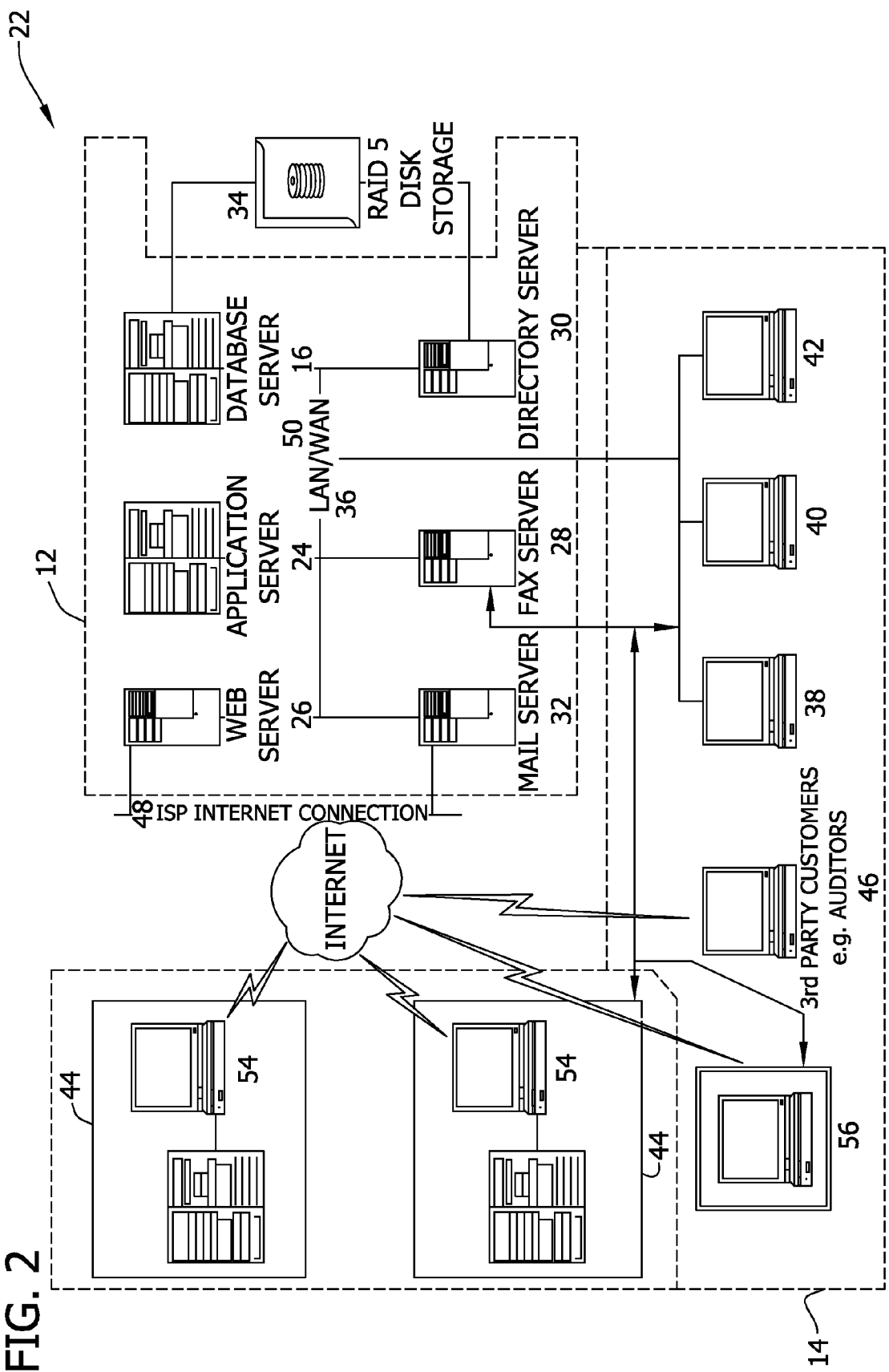
FIG. 2 is an expanded block diagram of an exemplary embodiment of a server architecture of a system in accordance with one embodiment of the present invention.

FIG. 2 is an expanded block diagram of an exemplary embodiment of a server architecture of a system 22 in accordance with one embodiment of the present invention. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., auditors/customers, 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
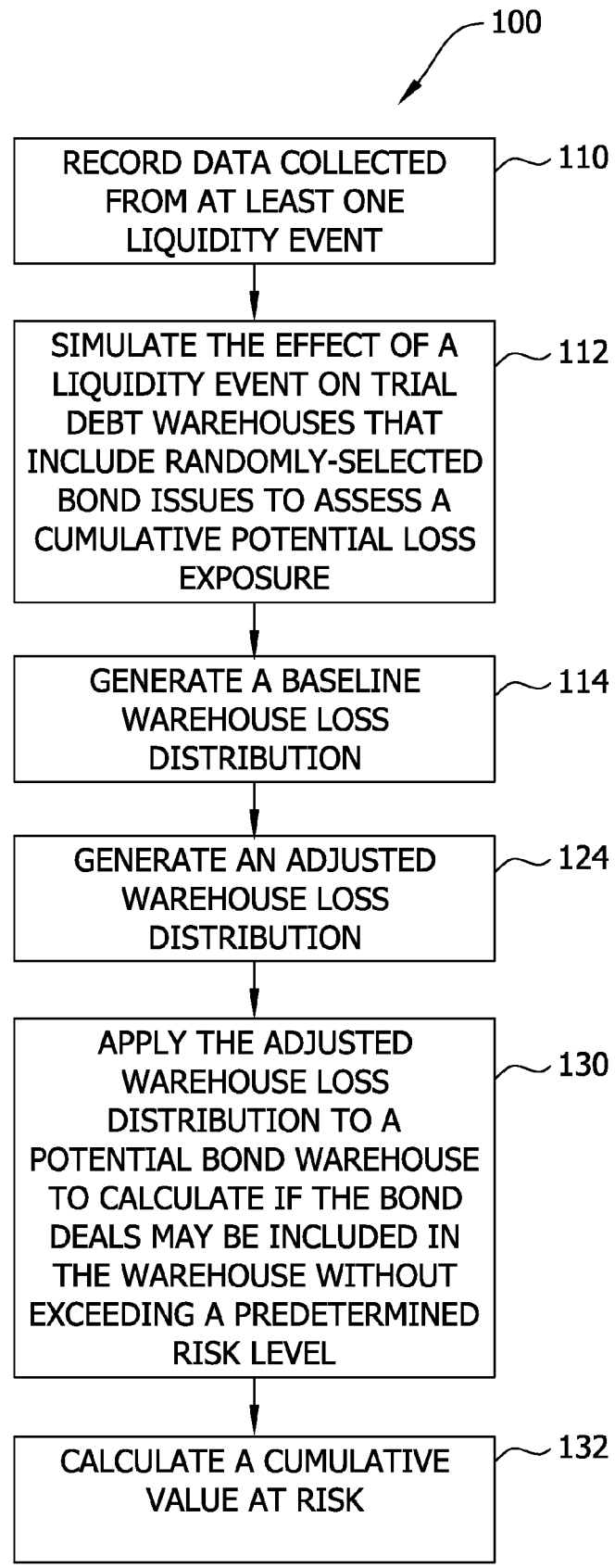
FIG. 3 is a flowchart illustrating exemplary processes utilized by the system shown in FIG. 1.

FIG. 3 is a flowchart 100 illustrating exemplary processes utilized by system 10 (shown in FIG. 1). The technical effect of system 10 is achieved by a user first recording 110 historical bond issue data collected from at least one liquidity event. Historical bond issue data may also be referred to as liquidity event data, as the data relates to specifics on how a bond issue performed during a known liquidity event. In the exemplary embodiment, recording 110 historical bond issue data includes recording actual bond prices, for example, actual bond prices on the first and last days of the liquidity event. In the exemplary embodiment, the data is recorded and stored in database 20 (shown in FIG. 1).

System 10 also simulates 112 the effect of a liquidity event on trial debt warehouses. The trial warehouses include a plurality of randomly-selected bond issues. The historical bond issue data allows a user to understand how individual bond issues were affected by the liquidity event. Simulating 112 allows system 10 to assess a cumulative VAR of a debt warehouse based on recorded historical bond issue data. In the exemplary embodiment, simulating 112 includes performing Monte Carlo trials on the liquidity event data stored in database 20 (shown in FIG. 1). Bond issues that correspond to data stored in database 20 are randomly-selected to populate trial debt warehouses having a predetermined maximum value. For example, bond issues may be randomly-selected to populate a debt warehouse having a value of no more than one-billion United States (U.S.) dollars. In an exemplary embodiment, more than ten-thousand Monte Carlo trials are performed to assess a cumulative VAR exposure based on recorded liquidity event data.

Figure 4:
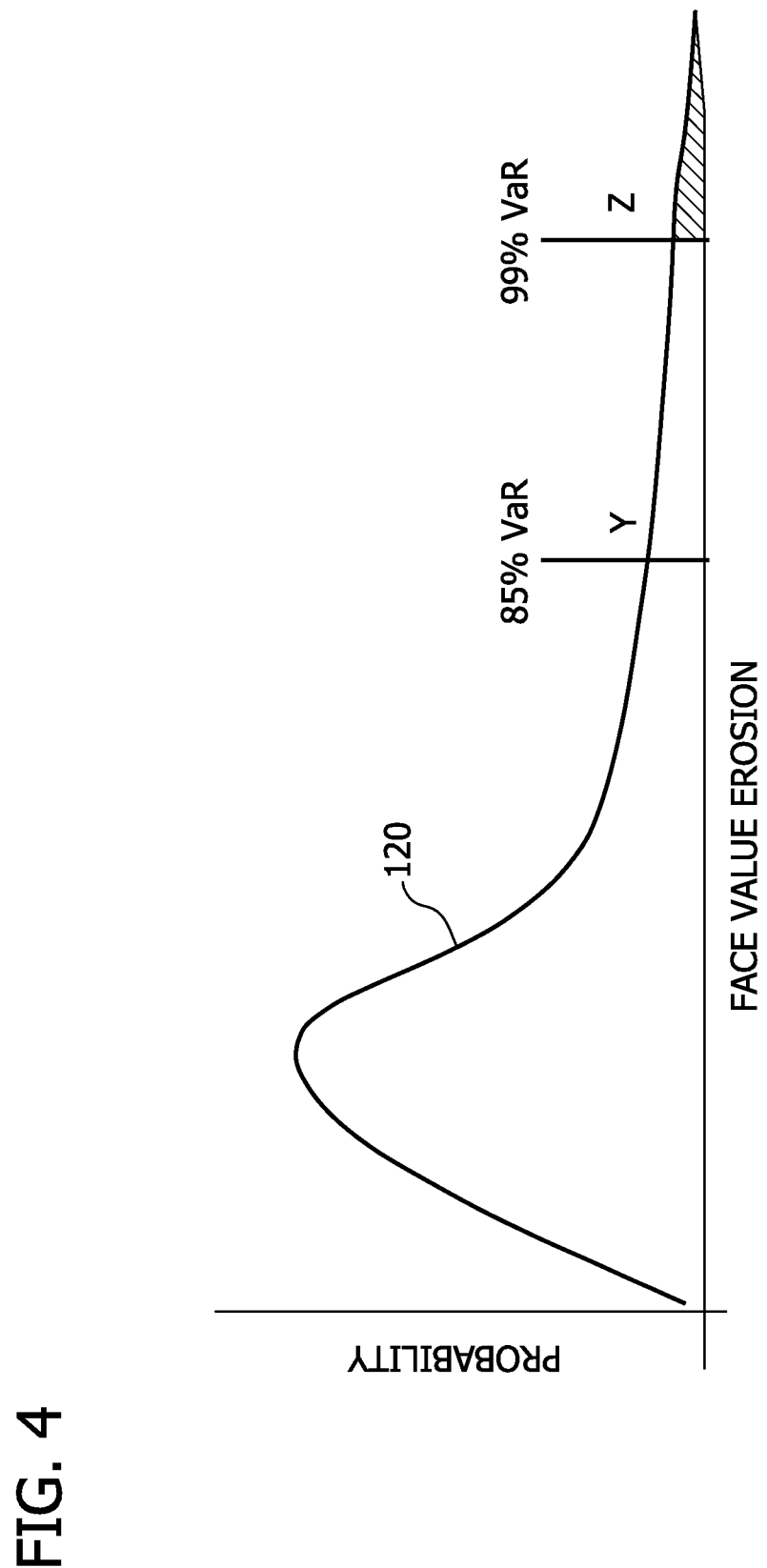
FIG. 4 is an exemplary probability curve showing a baseline loss distribution for a warehouse of high yield bonds during a liquidity event, which has been generated using the system shown in FIG. 1.

By further analyzing the assessed VAR exposure determined by simulating 112, system 10 generates 114 a baseline warehouse loss distribution. FIG. 4 is an exemplary probability curve that illustrates the baseline warehouse loss distribution 120 generated 114 by system 10. The baseline warehouse loss distribution 120 includes two aspects: a baseline VAR percentage and to what degree of certainty no more than that percentage of value will be eroded from the initial investment according to the recorded 110 historical bond issue data and simulations 112. In other words, from the baseline warehouse loss distribution 120, a baseline VAR percentage and a baseline probability of loss percentage are determined. The VAR percentage is a percentage of the underwriter's commitment, in other words, a percentage of the value the underwriter has agreed to purchase from the borrower. The probability of loss percentage is a probability that, according to recorded 110 bond issue data, the loss in a warehouse will be less than the baseline VAR percentage.

In one specific example, an investor assembles a debt warehouse which includes commitments to purchase a predetermined value of bonds, for example, bonds valued at X U.S. dollars. System 10 may determine that, based on recorded 110 data, there is an eighty-five percent (85%) chance that the maximum warehouse loss will be less than a first percentage of the commitment value, the first percentage referred to herein as Y %. Stated differently, system 10 may determine that if a liquidity event occurred, the likelihood of losing more than Y % of the commitment value is fifteen percent (15%). In the same example, system 10 may determine that based on recorded 110 data, there is a ninety-nine percent (99%) chance that the maximum warehouse loss will be less than a second percentage of the commitment value, the second percentage referred to herein as Z %. The likelihood of losing more than Z % of the commitment value is one percent (1%) if a liquidity event occurred while the underwriter held a debt warehouse that included commitments to X U.S. dollars of bonds. The baseline warehouse loss distribution 120 does not account for demand coupons or underwriting fees. In the specific example, Y % of the commitment value and Z % of the commitment value are each between 2% and 50% of the commitment value, and Y % typically is less than Z %. More specifically, Y % and Z % of the commitment value are each between 2% and 25% of the commitment value.

Figure 5:
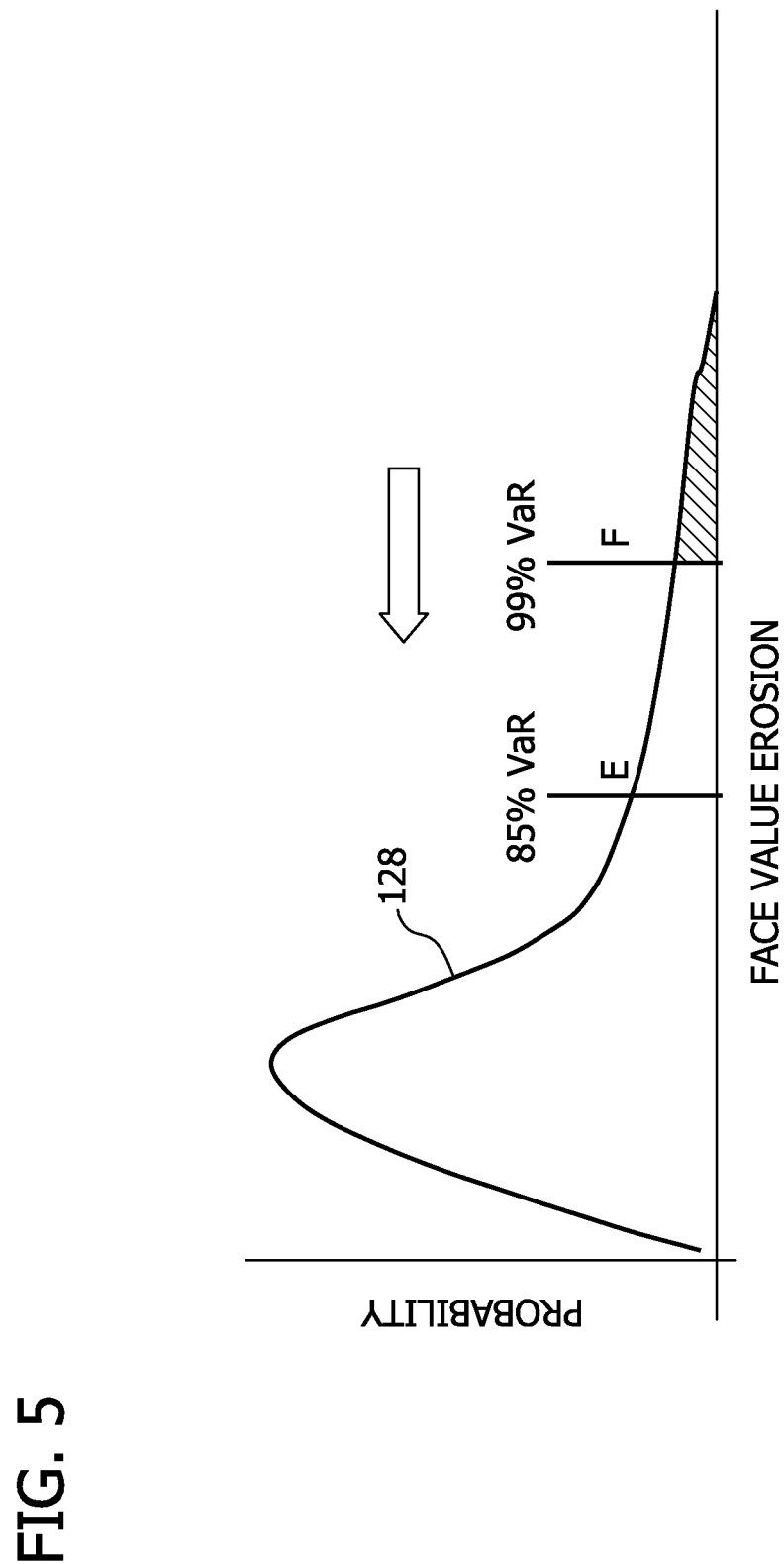
FIG. 5 is an exemplary probability curve showing an adjusted loss distribution for a warehouse of high yield bonds during a liquidity event, which has been generated using the system shown in FIG. 1.

System 10 also generates 124 an adjusted warehouse loss distribution 128. FIG. 5 is an exemplary probability curve that illustrates the adjusted warehouse loss distribution 128 generated 124 by system 10. The adjusted warehouse loss distribution 128 is generated 124 by adjusting the baseline warehouse loss distribution 120 to account for at least one of offsets due to demand coupons and offsets due to underwriting fees. The value of the demand coupons and underwriting fees used to adjust baseline warehouse loss distribution 120 are assumed values, for example, but not limited to, demand coupons of an average quantity of basis points for the bond market and underwriting fees of an average percentage for the bond market. In other words, system 10 generates 124 a distribution of simulated net loss results. In the specific example described herein at FIG. 6, the assumed demand coupon value is 200 basis points and the assumed underwriting fee value is 2.25% of the commitment value. However, the assumed demand coupon value can be a value other than 200 basis points, but typically the assumed demand coupon value would be between 100 and 300 basis points. The assumed underwriting fee value can also be a value other than 2.25%, but typically the assumed underwriting fee value would be between 1.0% and 5.0% of the commitment value.

A user can obtain two values from adjusted warehouse loss distribution 128: an adjusted VAR percentage and to what degree of certainty no more than the adjusted VAR percentage will be lost. The adjusted VAR percentage is an estimation of a maximum percentage of the underwriter's commitment that, according to recorded 110 bond issue data and assumed values of demand coupons and underwriting fees, may be lost if a liquidity event occurs while the underwriter is holding the bond warehouse. The probability of loss percentage is a probability that, according to recorded 110 bond issue data, the loss in a warehouse will be less than the adjusted VAR percentage.

In one specific example, an underwriter assembles a debt warehouse which includes commitments to purchase bonds worth a predetermined amount, herein referred to as D U.S. dollars. System 10 may determine that based on recorded 110 data and assumed underwriting fees and demand coupon values, there is an 85% chance that the loss in the warehouse will be less than a first percentage of the commitment, herein referred to as E %. In other words, system 10 may determine that if a liquidity event occurs while the underwriter is holding the example bond warehouse, the likelihood of losing more than E % of the commitment value is 15%. In the same example, system 10 may determine that based on recorded 110 data and assumed underwriting fees and demand coupon values, there is a 99% chance that the loss in the warehouse will be less than a second percentage of the commitment, herein referred to as F %. In other words, system 10 may determine that if a liquidity event occurs while the underwriter is holding the example bond warehouse, the likelihood of losing more that F % of the commitment value is 1%. Both the adjusted VAR percentage and the adjusted probability of loss percentage account for assumed demand coupons and underwriting fees. In the specific example, E % of the commitment value and F % of the commitment value are each between 2% and 50% of the commitment value, and E % typically is less than F %. More specifically, E % and F % of the commitment value are each between 2% and 25% of the commitment value.

System 10 is further configured to apply 130 the adjusted warehouse loss distribution 128 to a potential bond warehouse. The potential bond warehouse is a bond warehouse populated by an underwriter with current bond issues that the underwriter is interested in purchasing. By applying 130 the adjusted warehouse loss distribution 128 (shown in FIG. 5) to the individual bond issues included within the potential bond warehouse, system 10 determines whether the selected bond issues may be included in the warehouse without exceeding a predetermined risk level. For example, an investor may decide to assemble a one million U.S. dollar debt warehouse, i.e., a debt warehouse that includes a plurality of deals that when considered in total, form a one million dollar commitment by the investor. The investor may also decide not to invest in a debt warehouse unless there is an eighty-five percent (85%) probability that value erosion of the warehouse will not exceed thirty-thousand U.S. dollars. By applying the adjusted warehouse loss distribution 128, system 10 analyzes the deals that may collectively form a debt warehouse that meets the investor's criteria.

In the example, using the adjusted warehouse loss distribution 128, system 10 determines that if a liquidity event occurs, there would be an 85% percent probability that value erosion of the selected deal would not exceed E % of the underwriter's commitment. The adjusted VAR of E % is applied 130 to each of the bonds in the potential bond warehouse and system 10 calculates a base at-risk value from each bond. Each base at-risk value is further adjusted to generate final at-risk values that account for differences between the underwriting fees and/or demand coupons assumed in order to generate 124 the adjusted warehouse loss distribution 128 and the actual fees and/or demand coupons included in each potential deal. System 10 calculates 132 a cumulative at-risk value by summing the final at-risk values of each individual deal. In the example described above, if the cumulative at-risk value is below thirty-thousand U.S. dollars, the debt warehouse meets the underwriter's predetermined acceptable risk level.

FIG. 6 is an exemplary loss distribution table 200 generated by populating a potential debt warehouse with potential deals 202, 204, and 206 and performing process 100 (shown in FIG. 3). In the example warehouse analysis shown in table 200, first deal 202 has a deal size 220 of one-thousand, six-hundred, and forty million (1,640 MM) U.S. dollars. Deal size 220 is the total value of a bond issue offered by a borrower. Of the 1,640 MM dollars, the underwriter performing this analysis makes a thirty-two million (32 MM) U.S. dollar commitment 222 to first deal 202. That is, if first deal 202 is entered into, the underwriter would commit to purchasing 32 MM dollars of the 1,640 MM dollar bond issue. If the underwriter entered into, and fulfilled the terms of first deal 202, the underwriter would be entitled to underwriting fees 224 of 3.41% of commitment 222. The underwriter would also hold a demand coupon 226 of one-hundred and ten basis points that could be exercised upon the failure of first deal 202. First deal 202 has a "B" issuer rating 228 and is considered a high-yield investment 230. A probability 232 of first deal 202 occurring may be entered into table 200 and used in risk estimations. For example, the probability 232 of the underwriter entering into first deal 202 and/or of first deal 202 remaining available long enough for the underwriter to enter into it, may be used in risk estimation.

An effective deal size 240 of first deal 202 is calculated by adjusting deal commitment 222 to account for the difference in underwriting fees 224 and/or the value of demand coupons 226 when compared to the assumed underwriting fees and assumed value of demand coupons used to generate adjusted warehouse loss distribution 128 (shown in FIG. 5). For example, the effective deal size 240 of first deal 202 is forty-five million (45 MM) U.S. dollars while the investor's deal commitment 222 is thirty-two million (32 MM) U.S. dollars. The effective deal size 240 is larger than the deal commitment 222 due to actual deal fees 224 and/or demand coupons 226 being lower than the corresponding assumptions used when generating the adjusted warehouse loss distribution 128 (shown in FIG. 5). In other words, the exposure to an underwriter from first deal 202 is indicated in table 200 as being greater than the actual deal commitment 222 because should the underwriter enter into first deal 202, the underwriter would be entitled to a lower percentage of underwriting fees than used to generate the adjusted warehouse loss distribution 128 and/or entitled to exercise a lower value demand coupon than used to generate the adjusted warehouse loss distribution 128 (shown in FIG. 5).

In an exemplary embodiment, the effective deal size 240 is calculated by increasing deal commitment 222 by a scaling value. In the exemplary embodiment, the scaling value is determined based on underwriting fees and demand couples. For example, a portion of the scaling value may be calculated by comparing the assumed value of demand coupons to actual values of demand coupons 226. Another portion of the scaling value may be calculated by comparing the assumed value of underwriting fees to the actual underwriting fees 224. The method of comparison and the priority given to each of the portions of the scaling value comparisons are determined through analysis of historical bond data. In the exemplary embodiment, effective deal size 240 may be determined by applying the following equation, where effective deal size is referred to as EDS, S is a first scaling percentage, T is a second scaling percentage, $\Delta UF$ is a difference between the assumed value of underwriting fees and the actual underwriting fees, and $\Delta DC$ is a difference between the assumed value of demand coupons and the actual value of demand coupons:

$$EDS = Commitment \times (1 + S\% \times \Delta UF\% + T\% \times \Delta DC\%)$$   Formula 1

The effective deal size 240 is used to calculate a first base at-risk value 246 and a second base at-risk value 248. The base at-risk values 246 and 248 are calculated by applying adjusted warehouse loss distribution 128 (shown in FIG. 5). For example, adjusted warehouse loss distribution 128 shows that based on recorded 110 historical data and simulation 112 results, that if a liquidity event occurs while the underwriter is holding first deal 202, there is an 85% probability that no more than E % of the value of first deal 202 will erode. In the example shown in table 200, first base at-risk value 246 is E % of effective deal size 240, or more specifically, E % of 45 MM (i.e., 45 MM×E %). Similarly, adjusted warehouse loss distribution 128 (shown in FIG. 5) may provide that should a liquidity event occur, that there is a 99% probability that no more than F % of a deal's value would erode. In the example shown in table 200, second base at-risk value 248 is F % of effective deal size 240, or more specifically, F % of 45 MM (i.e., 45 MM×F %).

While effective deal size 240 accounts for the difference in assumed fees/demand coupon values compared to the actual fees 224/demand coupon values 226 of first deal 202 when the actual fees 224/demand coupon values 226 are lower than the assumed values, it is also advantageous to account for excess underwriting fees 254. As described above, when the effective deal size 240 is higher than the investor's actual commitment 222, that indicates that the investor's at-risk values should be calculated based on the higher, effective deal size 240 in order to account for lower fees 224/demand coupon values 226 than were used to generate adjusted warehouse loss distribution 128 (shown in FIG. 5). However, an investor is entitled to underwriting fees 224 whether first deal 202 fails or is successful. In the example of table 200, first deal 202 includes four-hundred thousand (400,000) U.S. dollars of underwriting fees above the assumed underwriting fees used to generate 124 (shown in FIG. 3) adjusted warehouse loss distribution 128 (shown in FIG. 5). Accordingly, in order to calculate excess fees 254, the assumed value for underwriting fees for adjusted warehouse distribution 128 (e.g., 2.25%) is subtracted from underwriting fees 224 for the deal and the resulting difference is multiplied by commitment amount 222 for the associated deal. The result is excess underwriting fees value 254.

Since the investor is entitled to excess fees 254, a first final at-risk value 260 and a second final at-risk value 262 are shown in table 200. Base at-risk values 246 and 248 are reduced by excess fees 254 that the investor would be entitled to should the investor enter into deal 202.

Table 200 also shows second deal 204. The analysis applied to first deal 202, and described above, is applied to second deal 204, and the results are shown in table 200. Furthermore, a first cumulative at-risk value 270 is calculated by adding first final at-risk value 260 of first deal 202 to first final at-risk value 260 of second deal 204. A second cumulative at-risk value 272 is calculated by adding second final at-risk value 262 of first deal 202 to second final at-risk value 262 of second deal 204. First cumulative at-risk values 270 and 272 would be the cumulative at-risk values for the entire warehouse, if the warehouse only included first deal 202 and second deal 204.

Third deal 206 is analyzed in the same manner as described above with regards to first deal 202 and second deal 204. In the example debt warehouse analysis illustrated in Table 200, if the debt warehouse included first deal 202, second deal 204, and third deal 206, the investor would have an 85% probability of the warehouse value eroding by less than ((45)E %−0.4)+((320)E %)+((623)E %−4.2) million U.S. dollars. Furthermore, the investor would have a 99% probability of the warehouse value eroding by less than ((45)F %−0.4)+((320)F %)+((623)F %−4.2) million U.S. dollars. These values, based on recorded 110 historical data and simulations 112 run to analyze that data, allow an investor to calculate an estimated loss based on a non-typical liquidity event, while taking into account fees and demand coupons.

While the invention has been described in terms of various specific embodiments, those skilled in the art will recognize that the invention can be practiced with modification within the spirit and scope of the claims.

What is claimed is:

1. A method for assessing underwriting and distribution risks associated with a portfolio of subordinate debt, said method performed using a server computer device coupled to a database, said method comprising:
    identifying at least one historical bond liquidity event impacting bonds included within a bond market index, the bond liquidity event defined at least in part by a predefined decline in the bond market index;
    storing in the database historical bond issue data for previously issued high yield bonds, including actual bond prices, for a predetermined period of time before and after the at least one historical bond liquidity event;
    generating, by the server computer device, a plurality of simulated subordinate debt warehouses by randomly selecting a plurality of the previously issued high yield bonds stored within the database for each simulated subordinate debt warehouse, such that the high yield bonds in each of the simulated subordinate debt warehouses are different from each other and all of the high yield bonds in the simulated subordinate debt warehouses are from the same predetermined period of time before and after the historical bond liquidity event;
    calculating, by the server computer device, a historical loss in value of each of the simulated subordinate debt warehouses based on a price history, over the predetermined period of time, of each of the plurality of the previously issued high yield bonds in the respective simulated subordinate debt warehouse, wherein the price history is automatically extracted by the server computer device from the database;
    generating, by the server computer device, a probability curve representing a historical loss distribution of the plurality of simulated subordinate debt warehouses based on a percentage of the historical loss in value of each simulated subordinated debt warehouse relative to an initial value of the respective simulated subordinate debt warehouse;
    receiving, at the server computer device from a user using a client computer device, a user input signal, the user input signal including candidate warehouse data and a user risk criteria, the candidate warehouse data including data representing a candidate warehouse having a plurality of candidate bonds for assessment, the user risk criteria including an acceptable value at risk resulting from a potential liquidity event and an acceptable percentage confidence level associated with the acceptable value at risk;
    determining, by the server computer device, at least one of an actual value at risk and an actual percentage confidence level for the candidate warehouse resulting from the potential liquidity event by applying the historical loss distribution to the candidate warehouse along with the user risk criteria, wherein the actual value at risk represents a value that an erosion of the candidate warehouse will not exceed based on the historical loss distribution and the acceptable percentage confidence level, and wherein the actual percentage confidence level represents a probability based on the historical loss distribution that the erosion of the candidate warehouse will not exceed the acceptable value at risk; and
    in response to determining the at least one of the actual value at risk and the actual percentage confidence level, reporting to the user, by the server computer device via a web-based interface, an indication of whether the user risk criteria has been satisfied, wherein the user risk criteria is determined by the server computer device to be satisfied in response to at least one of (i) the actual value at risk being no greater than the acceptable value at risk, and (ii) the actual percentage confidence level being no less than the acceptable percentage confidence level.

2. A method in accordance with claim 1, wherein applying the historical loss distribution to the portfolio of subordinate debt further comprises:
    generating a recommended subordinate debt warehouse that satisfies the selected risk criteria, based on the historical loss distribution.

3. A method in accordance with claim 1, wherein storing in the database historical bond issue data comprises storing a historical bond price from six months preceding the at least one historical bond liquidity event and a historical bond price from six months proceeding the at least one historical bond liquidity event, wherein the at least one historical bond liquidity event comprises a period of time wherein a decline in a bond market index was greater than any other time period being considered.

4. A method in accordance with claim 1, wherein generating the plurality of simulated subordinate debt warehouses and generating the historical loss distribution further comprises performing Monte Carlo trials on the historical bond issue data.

5. A method in accordance with claim 1, wherein generating the historical loss distribution further comprises generating a baseline warehouse loss distribution and generating an adjusted warehouse loss distribution by adjusting the baseline warehouse loss distribution to account for at least one of assumed underwriting fees and assumed demand coupon values.

6. A method in accordance with claim 5, wherein determining the actual value at risk for a portfolio of subordinate debt comprises applying the adjusted warehouse loss distribution to the candidate warehouse.

7. A method in accordance with claim 6, wherein determining the actual value at risk for the candidate warehouse further comprises:
    calculating an effective deal size of each potential bond deal included in the candidate warehouse;
    calculating a base value at risk of each potential bond deal; and
    adjusting the base value at risk of each potential bond deal to determine a final value at risk of each of the potential bond deals.

8. A method in accordance with claim 7, wherein calculating the effective deal size further comprises increasing a deal commitment value to account for differences between at least one of actual underwriting fees and the assumed underwriting fees and actual demand coupon values and the assumed demand coupon values.

9. A method in accordance with claim 1, further comprising:
  determining a scaling value by comparing an assumed value of underwriting fees to an actual value of the underwriting fees; and
  determining an effective deal size by increasing a deal commitment associated with each of a plurality of bond deals included in the candidate warehouse by the scaling value.

10. A server computer device for assessing underwriting and distribution risks associated with a portfolio of subordinate debt, said server computer device comprising a processor and a database, said server computer device configured to:
  identify at least one historical bond liquidity event impacting bonds included within a bond market index, the bond liquidity event defined at least in part by a predefined decline in the bond market index;
  store in said database historical bond issue data for previously issued high yield bonds, including actual bond prices, for a predetermined period of time before and after the at least one historical bond liquidity event;
  generate a plurality of simulated subordinate debt warehouses by randomly selecting a plurality of the previously issued high yield bonds stored within the database for each simulated subordinate debt warehouse, such that the high yield bonds in each of the simulated subordinate debt warehouses are different from each other and all of the high yield bonds in the simulated subordinate debt warehouses are from the same predetermined period of time before and after the historical bond liquidity event;
  calculate, using said processor, a historical loss in value of each of the simulated subordinate debt warehouses based on a price history, over the predetermined period of time, of each of the plurality of the previously issued high yield bonds in the respective simulated subordinate debt warehouse, wherein the price history is automatically extracted by the server computer device from the database;
  generate, using said processor, a probability curve representing a historical loss distribution of the plurality of simulated subordinate debt warehouses based on a percentage of the historical loss in value of each simulated subordinated debt warehouse relative to an initial value of the respective simulated subordinate debt warehouse;
  receive from a user using a client computer device, a user input signal, the user input signal including candidate warehouse data and a user risk criteria, the candidate warehouse data including data representing a candidate warehouse having a plurality of candidate bonds for assessment, the user risk criteria including an acceptable value at risk resulting from a potential liquidity event and an acceptable percentage confidence level associated with the acceptable value at risk;
  determine, using said processor, at least one of an actual value at risk and an actual percentage confidence level for the candidate warehouse resulting from the potential liquidity event by applying the historical loss distribution to the candidate warehouse along with the user risk criteria, wherein the actual value at risk represents a value that an erosion of the candidate warehouse will not exceed based on the historical loss distribution and the acceptable percentage confidence level, and wherein the actual percentage confidence level represents a probability based on the historical loss distribution that the erosion of the candidate warehouse will not exceed the acceptable value at risk; and
  in response to determining the at least one of the actual value at risk and the actual percentage confidence level, report to the user, by the server computer device via a web-based interface, an indication of whether the user risk criteria has been satisfied, wherein the user risk criteria is determined by the server computer device to be satisfied in response to at least one of (i) the actual value at risk being no greater than the acceptable value at risk, and (ii) the actual percentage confidence level being no less than the acceptable percentage confidence level.

11. A server computer device in accordance with claim 10, further configured to store at least one of a historical bond price from six months preceding the at least one historical bond liquidity event, a historical bond price on a first day of the event, a historical bond price on a last day of the event, and a historical bond price on from six months proceeding the at least one historical bond liquidity event, wherein the at least one historical bond liquidity event comprises a period of time wherein a decline in a bond market index was greater than any other time period being considered.

12. A server computer device in accordance with claim 10, further configured to perform Monte Carlo trials on the historical bond issue data to generate the plurality of simulated subordinate debt warehouses and the historical loss distribution.

13. A server computer device in accordance with claim 10, further configured to generate a baseline warehouse loss distribution and an adjusted warehouse loss distribution, said server computer device configured to generate the adjusted warehouse loss distribution by adjusting the baseline warehouse loss distribution to account for at least one of assumed underwriting fees and assumed demand coupon values.

14. A server computer device in accordance with claim 10, further configured to:
  calculate an effective deal size of each potential bond deal included in the candidate warehouse;
  calculate a base value at risk of each potential bond deal; and
  adjust the base value at risk of each potential bond deal to determine a final value at risk of each of the potential bond deals.

15. A server computer device in accordance with claim 14, further configured to calculate the effective deal size by increasing a deal commitment value to account for differences between at least one of actual underwriting fees and the assumed underwriting fees and actual demand coupon values and the assumed demand coupon values.

16. A server computer device in accordance with claim 14, further configured to adjust the base value at risk by calculating underwriting fees that exceed the assumed value and reducing the base value at risk to account for the excess underwriting fees.

17. A system for assessing underwriting and distribution risks associated with a portfolio of subordinate debt, said system comprising:
  a database for storing information; and
  a server system configured to be coupled to said database, said server further configured to:
    identify at least one historical bond liquidity event impacting bonds included within a bond market index, the bond liquidity event defined at least in part by a predefined decline in the bond market index;

store in said database historical bond issue data for previously issued high yield bonds, including actual bond prices, for a predetermined period of time before and after the at least one historical bond liquidity event;

generate a plurality of simulated subordinate debt warehouses by randomly selecting a plurality of the previously issued high yield bonds stored within the database for each simulated subordinate debt warehouse, such that the high yield bonds in each of the simulated subordinate debt warehouses are different from each other and all of the high yield bonds in the simulated subordinate debt warehouses are from the same predetermined period of time before and after the historical bond liquidity event;

calculate a historical loss in value of each of the simulated subordinate debt warehouses based on a price history, over the predetermined period of time, of each of the plurality of the previously issued high yield bonds in the respective simulated subordinate debt warehouse, wherein the price history is automatically extracted by the server computer device from the database;

generate a probability curve representing a historical loss distribution of the plurality of simulated subordinate debt warehouses based on a percentage of the historical loss in value of each simulated subordinated debt warehouse relative to an initial value of the respective simulated subordinate debt warehouse;

receive from a user using a client computer device, a user input signal, the user input signal including candidate warehouse data and a user risk criteria, the candidate warehouse data including data representing a candidate warehouse having a plurality of candidate bonds for assessment, the user risk criteria including an acceptable value at risk resulting from a potential liquidity event and an acceptable percentage confidence level associated with the acceptable value at risk;

determine at least one of an actual value at risk and an actual percentage confidence level for the candidate warehouse resulting from the potential liquidity event by applying the historical loss distribution to the candidate warehouse along with the user risk criteria, wherein the actual value at risk represents a value that an erosion of the candidate warehouse will not exceed based on the historical loss distribution and the acceptable percentage confidence level, and wherein the actual percentage confidence level represents a probability based on the historical loss distribution that the erosion of the candidate warehouse will not exceed the acceptable value at risk; and in response to determining the at least one of the actual value at risk and the actual percentage confidence level, report to the user, by the server computer device via a web-based interface, an indication of whether the user risk criteria has been satisfied, wherein the user risk criteria is determined by the server computer device to be satisfied in response to at least one of (i) the actual value at risk being no greater than the acceptable value at risk, and (ii) the actual percentage confidence level being no less than the acceptable percentage confidence level.

18. A system in accordance with claim 17, wherein said server is further configured to store at least one of a historical bond price from six months preceding the at least one historical bond liquidity event, a historical bond price on a first day of the event, a historical bond price on a last day of the event, and a historical bond price from six months proceeding the at least one historical bond liquidity event, wherein the at least one historical bond liquidity event comprises a period of time wherein a decline in a bond market index was greater than any other time period being considered.

19. A system in accordance with claim 17, wherein said server is further configured to perform Monte Carlo trials on the historical bond issue data to generate the plurality of simulated subordinate debt warehouses and the historical loss distribution.

20. A system in accordance with claim 17, wherein said server is further configured to generate a baseline warehouse loss distribution and an adjusted warehouse loss distribution, said server configured to generate the adjusted warehouse loss distribution by adjusting the baseline warehouse loss distribution to account for at least one of assumed underwriting fees and assumed demand coupon values.

21. A system in accordance with claim 20, wherein said server is further configured to:
calculate an effective deal size of each potential bond deal included in the candidate warehouse;
calculate a base value at risk of each potential bond deal; and
adjust the base value at risk of each potential bond deal to determine a final value at risk of each of the potential bond deals.

22. A system in accordance with claim 21, wherein said server is further configured to calculate the effective deal size by increasing a deal commitment value to account for differences between at least one of actual underwriting fees and the assumed underwriting fees and actual demand coupon values and the assumed demand coupon values.

23. A system in accordance with claim 21, wherein said server is further configured to adjust the base value at risk by reducing the base value at risk to account for underwriting fees that exceed the assumed underwriting fees.

24. A computer program embodied on a non-transitory computer readable medium for assessing underwriting and distribution risks associated with a portfolio of subordinate debt, said program comprising at least one code segment that, when executed by a server computer device, causes the server computer device to:
identify at least one historical bond liquidity event impacting bonds included within a bond market index, the bond liquidity event defined at least in part by a predefined decline in the bond market index;
store in a database historical bond issue data for previously issued high yield bonds, including actual bond prices, for a predetermined period of time before and after the at least one historical bond liquidity event;
generate a plurality of simulated subordinate debt warehouses by randomly selecting a plurality of the previously issued high yield bonds stored within the database for each simulated subordinate debt warehouse, such that the high yield bonds in each of the simulated subordinate debt warehouses are different from each other and all of the high yield bonds in the simulated subordinate debt warehouses are from the same predetermined period of time before and after the historical bond liquidity event;
calculate a historical loss in value of each of the simulated subordinate debt warehouses based on a price history, over the predetermined period of time, of each of the plurality of the previously issued high yield bonds in the respective simulated subordinate debt warehouse, wherein the price history is automatically extracted by the server computer device from the database;

generate a probability curve representing a historical loss distribution of the plurality of simulated subordinate debt warehouses based on a percentage of the historical loss in value of each simulated subordinated debt warehouse relative to an initial value of the respective simulated subordinate debt warehouse;

receive from a user using a client computer device, a user input signal, the user input signal including candidate warehouse data and a user risk criteria, the candidate warehouse data including data representing a candidate warehouse having a plurality of candidate bonds for assessment, the user risk criteria including an acceptable value at risk resulting from a potential liquidity event and an acceptable percentage confidence level associated with the acceptable value at risk;

determine at least one of an actual value at risk and an actual percentage confidence level for the candidate warehouse resulting from the potential liquidity event by applying the historical loss distribution to the candidate warehouse along with the user risk criteria, wherein the actual value at risk represents a value that an erosion of the candidate warehouse will not exceed based on the historical loss distribution and the acceptable percentage confidence level, and wherein the actual percentage confidence level represents a probability based on the historical loss distribution that the erosion of the candidate warehouse will not exceed the acceptable value at risk; and in response to determining the at least one of the actual value at risk and the actual percentage confidence level, report to the user, by the server computer device via a web-based interface, an indication of whether the user risk criteria has been satisfied, wherein the user risk criteria is determined by the server computer device to be satisfied in response to at least one of (i) the actual value at risk being no greater than the acceptable value at risk, and (ii) the actual percentage confidence level being no less than the acceptable percentage confidence level.

25. A computer program in accordance with claim 24 further comprising at least one code segment that causes the server computer device to store at least one of a historical bond price from six months preceding the at least one historical bond liquidity event, a historical bond price on a first day of the event, a historical bond price on a last day of the event, and a historical bond price from six months proceeding the at least one historical bond liquidity event, wherein the at least one historical bond liquidity event comprises a period of time wherein a decline in a bond market index was greater than any other time period being considered.

26. A computer program in accordance with claim 24 further comprising at least one code segment that causes the server computer device to perform Monte Carlo trials on the historical bond issue data to generate the plurality of simulated subordinate debt warehouses and the historical loss distribution.

27. A computer program in accordance with claim 24 further comprising at least one code segment that causes the server computer device to generate a baseline warehouse loss distribution and an adjusted warehouse loss distribution by adjusting the baseline warehouse loss distribution to account for at least one of assumed underwriting fees and assumed demand coupon values.

28. A computer program in accordance with claim 27 further comprising at least one code segment that causes the server computer device to:

calculate an effective deal size of each potential bond deal included in the candidate warehouse;

calculate a base value at risk of each potential bond deal; and adjust the base value at risk of each potential bond deal to determine a final value at risk of each of the potential bond deals.

29. A computer program in accordance with claim 28 further comprising at least one code segment that causes the server computer device to calculate the effective deal size by increasing a deal commitment value to account for differences between at least one of actual underwriting fees and the assumed underwriting fees and actual demand coupon values and the assumed demand coupon values.

30. A computer program in accordance with claim 28 further comprising at least one code segment that causes the server computer device to adjust the base value at risk by calculating underwriting fees that exceed the assumed value and reducing the base value at risk to account for the excess underwriting fees.

31. A method for assessing underwriting and distribution risks associated with a portfolio of subordinate debt, said method performed using a server computer device coupled to a database, said method comprising:

identifying at least one historical bond liquidity event impacting bonds included within a bond market index, the bond liquidity event defined at least in part by a predefined decline in the bond market index;

storing in the database historical bond issue data for previously issued high yield bonds, including actual bond prices, for a predetermined period of time before and after the at least one historical bond liquidity event;

generating, by the server computer device, a plurality of simulated subordinate debt warehouses using the historical bond issue data stored in the database, wherein each simulated subordinate debt warehouse includes a plurality of the previously issued high yield bonds randomly selected from the historical bond issue data based on criteria including selecting only bond issues with available market pricing for the first day and last day of the bond liquidity event, a predetermined limit on the number of bonds in each of the simulated subordinate debt warehouses, and a value of the bonds in each of the simulated subordinate debt warehouses, and wherein the high yield bonds in each of the simulated subordinate debt warehouses are different from each other;

calculating, by the server computer device, a historical loss in value of each of the simulated subordinate debt warehouses based on the available market pricing for the first day and last day of the bond liquidity event, wherein the available market pricing is automatically extracted by the server computer device from the database for each of the previously issued high yield bonds associated with the respective simulated subordinate debt warehouse;

generating, by the server computer device, a probability curve representing a historical loss distribution based of the plurality of simulated subordinate debt warehouses based on a percentage of the historical loss in value of each simulated subordinated debt warehouse relative to an initial value of the respective simulated subordinate debt warehouse;

receiving, by the server computer device, from a user using a client computer device, a user input signal, the user input signal including candidate warehouse data and a user risk criteria, the candidate warehouse data including data representing a candidate warehouse having a plurality of candidate bonds for assessment, the user risk criteria including an acceptable value at risk resulting from a potential liquidity event and an acceptable percentage confidence level associated with the acceptable value at risk;

determining, by the server computer device, at least one of an actual value at risk and an actual percentage confidence level for the candidate warehouse resulting from the potential liquidity event by applying the historical loss distribution to the candidate warehouse along with the user risk criteria, wherein the actual value at risk represents a value that an erosion of the candidate warehouse will not exceed based on the historical loss distribution and the acceptable percentage confidence level, and wherein the actual percentage confidence level represents a probability based on the historical loss distribution that the erosion of the candidate warehouse will not exceed the acceptable value at risk; and in response to determining the at least one of the actual value at risk and the actual percentage confidence level, reporting to the user, by the server computer device via a web-based interface, an indication of whether the user risk criteria has been satisfied, wherein the user risk criteria is determined by the server computer device to be satisfied in response to at least one of (i) the actual value at risk being no greater than the acceptable value at risk, and (ii) the actual percentage confidence level being no less than the acceptable percentage confidence level.

* * * * *